UNITED STATES PATENT OFFICE.

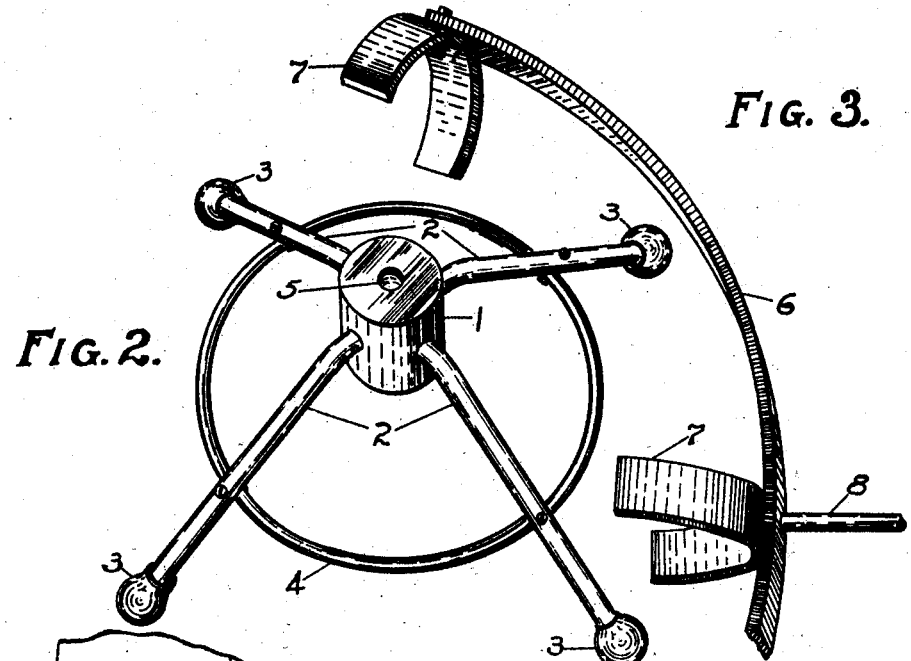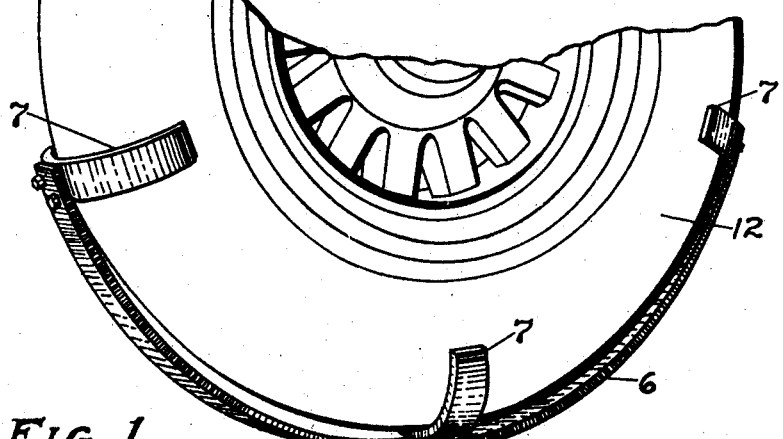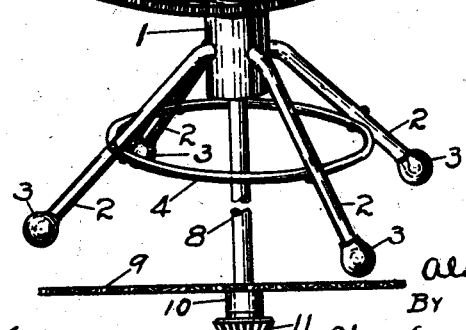

ALOYS P. SCHMITT, OF BUFFALO, NEW YORK.

SUPPORT FOR TIRE-CASINGS, &c.

1,391,857.    Specification of Letters Patent.    Patented Sept. 27, 1921.

Application filed September 30, 1919. Serial No. 327,517.

*To all whom it may concern:*

Be it known that I, ALOYS P. SCHMITT, a citizen of the United States, residing at Buffalo, county of Erie, and State of New York, have invented certain new and useful Improvements in Supports for Tire-Casings, &c., of which the following is a specification.

This invention relates to improvements in display supports and particularly to holders for tire casings and other annular objects.

The object of my invention is to provide a form of support adapted to hold the tire casing, or casing and wheel in an upright position for display and also to turn the casing by power means to attract attention and show all sides.

Another object is to provide a support of simple construction which is strong and rigid and easily demountable.

These and other objects are attained in the tire support described in the following specification and illustrated in the accompanying drawings in which like parts are identified by the same characters in the different views.

Figure 1 is a perspective elevation of a support for tire casings with a portion of a wheel and tire casing and a side elevation of the lower end of a driving shaft through a section of the floor.

Fig. 2 is a perspective view of the support base.

Fig. 3 is a perspective view of a portion of the casing holder.

My improved display tire support consists of a body 1 and legs 2, 2, 2 and 2 with suitable ball shaped feet 3, 3, 3 and 3. The legs 2, 2, etc., are braced by a ring 4 fastened to each leg. Through the center of the body 1 is a hole 5 suitably formed to make a bearing for the shaft 8, and which is fastened at the top to the semi-circular holder 6, and at its lower end to the bevel gear 11 by means of which the shaft and holder are rotated from any suitable power means.

The semi-circular holder 6 is of a shape to conform approximately to the circumference of the tire casing 12 to be held and has curved arms 7, 7 and 7 to approximately conform to the size of the casing section to hold the same in a vertical position.

9 represents a section of the floor on which the support rests and has a bearing 10 fastened beneath it through which the shaft 8 runs.

The operation of the support will be readily understood from the above description and consists of rotating the holder 6 and the casing 12, which is held by the arms 7, 7 and 7 to show both sides.

Having thus described my invention, what I claim is—

In a tire holder, a vertical cylindrical shaped body, a shaft bearing hole formed longitudinally through the center of said body, said body supported by means of legs comprising rods inserted at right angles into said body and bent downward to meet the floor at an angle, a ring fastened to each of said legs to form a brace for said legs, a semi-circular shaped holder mounted on said body by means of a shaft extending through the hole in said body, said holder being formed of a flat strip of material and having flat semi-circular shaped arms fastened at right angles to said holder and means to rotate said shaft and holder, as shown and described.

In testimony whereof, I have hereunto subscribed my name, this 29th day of Sept., 1919, in the presence of two subscribing witnesses.

ALOYS P. SCHMITT.

Witnesses:
G. S. VAN GORDER,
HELEN EVELYN JOYCE.